April 9, 1935.  C. A. FUCHS  1,997,297
CARBON SAVER FERRULE FOR UNCUT CARBON ELECTRODE STICKS
Filed July 11, 1934  2 Sheets-Sheet 1
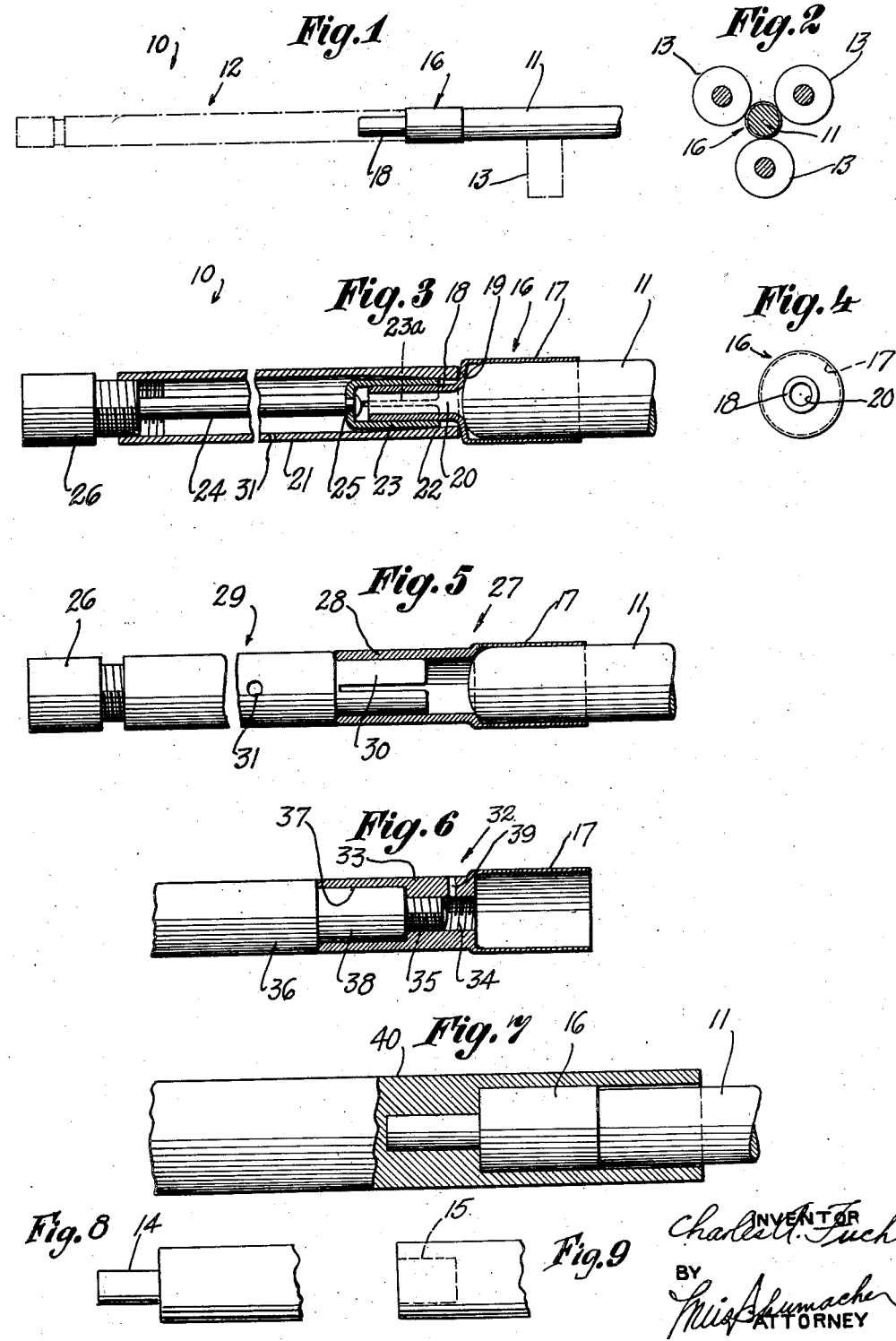

April 9, 1935.  C. A. FUCHS  1,997,297
CARBON SAVER FERRULE FOR UNCUT CARBON ELECTRODE STICKS
Filed July 11, 1934    2 Sheets-Sheet 2
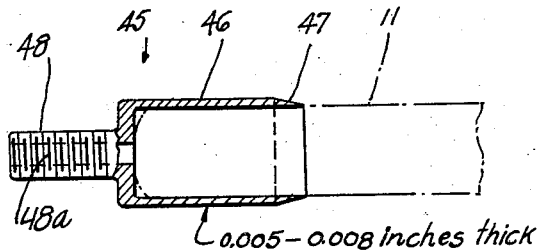
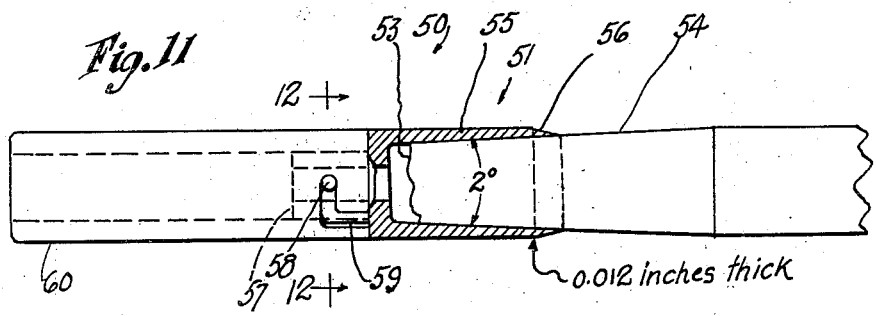
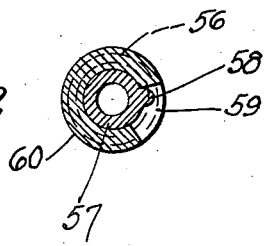

Patented Apr. 9, 1935

1,997,297

UNITED STATES PATENT OFFICE 1,997,297

CARBON SAVER FERRULE FOR UNCUT
CARBON ELECTRODE STICKS

Charles A. Fuchs, Hollis, Long Island, N. Y., assignor, by mesne assignments, to Projector Improvement Company, Inc., New York, N. Y., a corporation of New York Application July 11, 1934, Serial No. 734,624

10 Claims. (Cl. 176—119)

This invention relates to carbon savers and methods of securing the same to carbon electrode sticks such as those used in motion picture projection machines.

One object of the invention is to provide an improved device including a simple discardable element or ferrule that is easily and reliably attached to an uncut carbon stick.

Heretofore it has been necessary to undercut or counterbore the carbon stick to provide a way of securing the carbon such that the securing means would not exceed the diameter of the carbon and hence would be movable through the rollers of the carbon feeding head. To counterbore or undercut the carbon is naturally expensive, and affords at best a breakable joint portion. Other factors bearing on the problem are that the carbon must be held straight and in true alinement and in a sufficiently strong and rigid manner so as to maintain the carbon arc in focus and to cause accurate feeding and rotation of the carbon. At the same time, the carbon saver must be very inexpensive to use, otherwise there would be no advantage in endeavoring to consume the short lengths of carbon that would otherwise be discarded.

By my invention, the above drawbacks are eliminated, and in particular, the undercutting and counterboring of the carbon stick are avoided so that a standard carbon can be used directly.

Another object of the invention is the provision of a device having few and simple parts, and which is inexpensive to manufacture, convenient, rapid, reliable, and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a side view of a device embodying the invention, showing in dot dash lines a roller of a carbon feeder head.

Fig. 2 is a sectional view of the device passing through the rollers of a feeder head with the rollers engaging the carbon saver ferrule.

Fig 3 is an enlarged longitudinal sectional view of the device.

Fig. 4 is an end view of the ferrule.

Fig. 5 is a side view with parts in section of a modified device embodying the invention.

Fig. 6 is a fragmentary view with parts in section of a further modification thereof.

Fig. 7 shows a device used in practising the method of the invention.

Figs. 8 and 9 are fragmentary views of different carbon sticks adapted to be engaged by a clutch.

Fig. 10 is a view partly in section showing a modified ferrule embodying the invention.

Fig. 11 is a view partly in section of a still further modification of a device embodying the invention.

Fig. 12 is a sectional view taken on line 12—12 of Fig. 11.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 10 denotes a device embodying the invention. The same may include a carbon electrode stick 11, and an extension or clutch element 12, adapted to be fed through the rollers 13 of a carbon feeding head. The rollers preferably include three angularly spaced rollers one of which is a radially movable idler. In order for the device 10 to pass through the rollers, the device must be alined and of substantially constant diameter throughout, because the idler has very limited radial motion and because the axis of the carbon must be maintained through the focal point of the projector.

To permit use of a standard carbon stick, that is, one free of the undercut portion or pin 14 shown in Fig. 8 and of the counterbore or tubular portion 15 of Fig. 9, an intermediate means 16 may be employed. The latter may be arranged to have a press fitted connection with the carbon stick and a detachable engagement with the member 12, and is discardable with the carbon when the latter is sufficiently consumed.

The means 16 may consist of a one piece device having at one end a circularly continuous tubular wall 17 not substantially greater in outside diameter than that of the carbon so that the means 16 can readily pass through the rollers without affecting the position of the arc. Into this wall, the carbon stick is tightly or snugly engaged or tightly fitted, directly or with the aid of adhesive or powdered or plastic materials of carbon or the like. Desirably the wall 17 is pliable or yieldable or circumferentially stretchable, as by reason of the thinness of the wall 17 or the material of which the same consists, or both. For example, the material may be relatively soft or adapted to yield under moderate stress, such as brass, or a soft pure iron, which are not brittle, and do not possess excessive tensile strength. Composition materials which can withstand temperatures within a couple of inches from the carbon arc can also be used. By press fitting the carbon stick into the wall 17, a strong reliable connection is afforded in a very simple manner. Since the wall 17 is preferably approximately three or four and not more than five thousandths of an inch in thickness, ordinary hand pressure is sufficient to effect the press fit.

In press fitting the carbon into the wall 17, the surface of the carbon yields in that the fine surface granules are caused to readjust and adapt themselves along the carbon surface and in interstices thereof, under the sliding pressure of the wall 17, thereby assuring a very tight, wedge like engagement, by reason of the dissimilarity of the carbon and ferrule materials.

The opposite end of the member or ferrule 16 may have a rigid portion of suitable size, shape and construction whereby the ferrule may be manipulated. Desirably the said rigid portion is alined with the wall 17, and it may be in the nature of a rod of any required length, or relatively short for engagement in the clutch. This rigid portion 18 is preferably of substantially smaller diameter than the tubular wall 17, and may be connected with the latter by an annular flange or step 19 that is rigid and thicker than the tubular wall 17. Further, the portion 18 may have an axial passage 20 in communication with the interior of the wall 17 for bleeding gases generated or expanded in the latter, and possibly related to the carbon material that acts as a closure for the wall 17.

The member 12 may be termed the carbon saver, and may be of any suitable construction and may have a tube 21 having at one end a taper 22 for causing compression of a clutch element 23 slotted at 23a and actuable by a rod 24 swiveled to the element at 25. A finger piece 26 threaded to the tube 21 may move the element to the right to grip the ferrule portion 18 or to the left to cause release of the latter.

In Fig. 5 is shown a modification of the invention including a ferrule 27 that differs from the ferrule 16 in that the portion 18 is replaced by one 28 of approximately the same diameter as the tubular wall 17, so that a device 29 having an expansible clutch element 30 is receivable in the portion 28 for gripping the latter. The element 30 may be expanded in a well known manner by a cone (not shown) actuated axially by the threaded finger piece 26. To facilitate exit of gases from the ferrules 16 and 28, a pin hole 31 may be provided at a suitable point in the devices 12 and 29.

In Fig. 6 is shown a modification of the invention including the ferrule 32 which may be the same as those hereinbefore shown, except at the securing portion 33 thereof. The latter may have a thread 34 for removable engagement with a screw portion 35 of a rod 36, and an undercut 37 for guiding engagement with a shoulder 38 of the rod. A vent hole 39 may be provided.

In constructing an embodiment of the invention, a rod or tube is bored out or cut down to provide the ferrule 16, 27 or 32, with the thin pliable wall 17. Then the ferrule is inserted in a fitted tubular head or guide 40 and the carbon stick 11 press fitted thereinto by machine or hand pressure, the guide preventing breakage or distortion of the ferrule.

It is seen that the device 12 may be engaged with the pin 14 of the carbon of Fig. 8, and that the device 29 is engageable in the bore 15 of the carbon stick of Fig. 9. In other words, devices now in use may be utilized in this invention, and are protected by the ferrules from excessive heat, since said devices need not approach as closely to the carbon arc as formerly.

It will be appreciated that the ferrule is well adapted to withstand the heat adjacent to the carbon arc, and that the heavy parts such as 23, 28 or 33, together with the devices 12, 29 constitute heads for rapidly abstracting and dissipating the heat in the ferrule.

In Fig. 10 is shown a further modification of the invention embodied in a ferrule 45, having a circularly continuous tubular wall 46, different from those hereinbefore described in that this wall may be made thicker, by reason of the provision of an annular external bevel or taper 47 to permit the ferrule to enter between the rollers 13. For example, the wall 46 may be up to 0.008 inches thick, but may of course be thinner, preferably not less than 0.005 inches, so that the wall 46 may be said to be self sustaining, whereby it can be more easily manufactured, and can be applied to the carbon by suitable pressure without requiring the guide 40. The tubular anchor portion 48 of the ferrule may be in coaxial alined relation with the wall 46, and of smaller diameter than the latter, and externally threaded at 48a for releasable attachment in a threaded tube or carbon saver.

In Figs. 11 and 12 is shown a still further modification of the invention, including a device 50 comprising a ferrule 51, in which is fitted the burnt end of a carbon stick 52. I have observed that the region at the burnt end 53 of a carbon stick reduces in size along a taper 54, and that the angle of the taper and reduction in diameter is very constant. By using this end of the carbon stick, I can make the circularly continuous tubular wall 55 of the ferrule considerably thicker. To assure a snug, tight fit, I preferably provide a corresponding taper in the internal bore or surface of the ferrule, at an angle of approximately 2 degrees. I have found that the thickness of the wall at the open end thereof may be as much as approximately 0.015 inches, although it may also be considerably less, and is preferably approximately 0.012 inches. A slight external end bevel 56 may be provided if desired. The maximum thickness at the opposite end of the wall 55 may be 0.025 inches, and is preferably approximately 0.020 inches. The tubular coaxially alined anchor portion 57 may have a pin or projection 58 pressed therefrom for releasable engagement in the bayonet slot 59 at the end of a tube 60.

If the wall 55 be sufficiently pliable or stretchable, the internal passage thereof may be cylindrical and the wall stretched to fit the carbon stick along and according to the taper thereof.

The devices of Figs. 10 and 11 may be made of any relatively soft, heat resisting material as hereinbefore stated, although, with the very thin ferrule holding walls such as 17, I preferably use a soft steel, since brass is enlarged by the flattening and pressing action of the rollers 13 of the carbon feeding head.

It will be appreciated that in the ferrules 45, 51, actual stretching thereof by the press fitting of the carbons is of less significance, so that the different modifications represent a transition in this respect.

The fitted end of the carbon stick may be coated with an anyl acetate or other binder, filler or adhesive which is sufficiently thin not to affect the electrical conductivity between the ferrule and carbon stick, and which will not vaporize under heat. The coating will facilitate insertion of the carbon stick into the ferrule, and permit a lesser degree of pressure to be used. In this sense, the term press fit need not be used according to its literal meaning, but may denote a fit or connection that is not dependent on any particular irregularity, threaded engagement, or the like. Rather the term press fit may be employed in the sense that a permanent connection is obtained, the ferrule being discardable with the carbon end left after the carbon is practically entirely consumed. However, I do not desire to be limited strictly to a permanent connection, since it might be possible to pull out the carbon stick from the ferrule, although to do that would require too careful an adjustment in sizes and/or application of pressure.

In the device of Fig. 11, a tight connection can be obtained without much pressure and regardless whether an adhesive or filler be used, since the tapered burnt end of the carbon is considerably softer than the unburnt end thereof. For the same reason, expansion of the ferrule need not occur, as it need not occur if an adhesive or filler be employed.

If the ferrule wall 17, 46 and 55 were made by boring, there would result fine internal annular grooves and ridges, too difficult to detect with the naked eye, but which would weaken the ferrule wall while permitting a tighter engagement with the carbon. To provide a wall of even thickness or taper, I preferably manufacture the ferrule by stamping the same from a piece of sheet metal.

It will now be seen that I have provided ferrules for uncut carbon sticks for connection of the latter with any suitable extension or carbon saver, such as 12, 29, 36, 60, and the like. While the ferrule may also be arranged to interconnect carbon sticks it is not desirable for that purpose, since the ferrule cannot form an arc and is ordinarily quite difficult to remove from a carbon stick.

It will thus be appreciated that various changes and modifications may be made in the device as shown in the drawings, and that the same is submitted in an illustrative and not in a limiting sense, the scope of the invention being defined in the following claims.

I claim:

1. A carbon electrode saver, including a carbon stick and a ferrule therefor including a tubular portion of a material adapted to withstand the heat of the carbon arc at the end of the carbon stick remote from the arc, said portion having a continuous circular wall, said wall being circumferentially yieldable, and said end of the carbon stick being of substantially equal diameter with the latter and being press fitted into said portion to rigidly secure the carbon stick to the ferrule.

2. A carbon electrode saver including a carbon stick and a holder therefor, said holder having a tubular circularly continuous ferrule portion into which an end portion of the carbon stick is press fitted so that the wall of said tubular portion is circularly tensioned, said carbon stick being of a substantially uniform diameter throughout slightly greater than the initial internal diameter of the tubular portion, and said tubular portion being only slightly greater in external diameter than the carbon stick in the press fitted position of the latter, whereby the carbon stick and tubular portion are adapted to be passed through the rollers of a carbon feeder head.

3. A carbon electrode saver including a carbon stick of substantially uniform diameter, and a holder therefor, said holder having a tubular portion into which an end portion of the carbon stick is press fitted, said tubular portion having a thin wall less than five one thousandths of an inch in thickness, that is circularly continuous, and consists of a metal that is sufficiently pliable so that said wall is stretchable, and said metal being sufficiently strong to avoid breakage of said wall.

4. A device including a carbon electrode stick and a one piece holder therefor, said holder having one end portion having a circularly continuous relatively pliable wall in which the carbon stick is tightly fitted, said wall having an external diameter not materially larger than that of the carbon stick, and said holder having an opposite end portion having a tubular wall of substantially greater stiffness than the first mentioned wall, as and for the purpose described.

5. A device including a carbon electrode stick of substantially uniform diameter throughout, and holder therefor, the holder having an end portion having a stretchable circularly continuous tubular wall in which the carbon stick is tightly fitted, with the outside diameter of said tubular wall being not substantially larger than that of the carbon stick, and the other end of the holder having a rigid tubular wall of substantially less diameter than that of the first mentioned wall, the passages of said walls being in communication with each other.

6. In combination with a carbon electrode stick of substantially uniform diameter throughout, and an extension having a clutch engageable with a carbon stick, of a holder intermediate of the extension and carbon stick, said holder having at one end a circularly continuous tubular stretchable portion in which the carbon stick is press fitted, and at its opposite end a rigid portion to which the clutch is engaged, said extension, holder and carbon stick being of substantially the same external diameter.

7. In combination with a carbon stick having a burnt end resulting in a taper, of a tubular circularly continuous holder having press fitted engagement with the tapered portion of the carbon stick.

8. A device including a carbon electrode stick having a burnt end resulting in a tapered portion adjacent said end, and a ferrule having a circularly continuous tubular wall having a corresponding internal taper, said tapered end of the carbon being snugly secured in the said wall, and said ferrule having an alined end portion for detachable engagement with a carbon saver.

9. The method of securing a carbon electrode stick to a tube, including permanently press fitting the burnt end portion of the stick into said tube.

10. The method of securing a carbon electrode stick to a tube, including coating an end of the carbon stick with an adhesive in such manner as not to reduce electrical conductivity to the carbon stick, and press fitting said end of the carbon stick into the tube.

CHARLES A. FUCHS.